(12) United States Patent
Yoshida et al.

(10) Patent No.: US 10,355,856 B2
(45) Date of Patent: Jul. 16, 2019

(54) KEY EXCHANGE METHOD, KEY EXCHANGE SYSTEM, KEY DISTRIBUTION DEVICE, COMMUNICATION DEVICE, AND PROGRAM

(71) Applicant: NIPPON TELEGRAPH AND TELEPHONE CORPORATION, Chiyoda-ku (JP)

(72) Inventors: Reo Yoshida, Musashino (JP); Hitoshi Fuji, Musashino (JP); Tetsutaro Kobayashi, Musashino (JP); Tomohide Yamamoto, Musashino (JP); Yuto Kawahara, Musashino (JP); Kazuki Yoneyama, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/579,749

(22) PCT Filed: Apr. 21, 2016

(86) PCT No.: PCT/JP2016/062601
§ 371 (c)(1),
(2) Date: Dec. 5, 2017

(87) PCT Pub. No.: WO2016/199507
PCT Pub. Date: Dec. 15, 2016

(65) Prior Publication Data
US 2018/0183583 A1    Jun. 28, 2018

(30) Foreign Application Priority Data
Jun. 9, 2015  (JP) .................................. 2015-116322

(51) Int. Cl.
H04L 9/08      (2006.01)
H04L 9/30      (2006.01)
H04L 9/32      (2006.01)

(52) U.S. Cl.
CPC .............. *H04L 9/0833* (2013.01); *H04L 9/08* (2013.01); *H04L 9/0869* (2013.01); *H04L 9/30* (2013.01); *H04L 9/3236* (2013.01)

(58) Field of Classification Search
CPC ....... H04L 9/0833; H04L 9/08; H04L 9/0869; H04L 9/30; H04L 9/3236
(Continued)

(56) References Cited

U.S. PATENT DOCUMENTS 5,768,389 A * 6/1998 Ishii ...................... H04L 9/0897
                                                380/277
7,260,716 B1 * 8/2007 Srivastava ............ H04L 9/0825
                                                380/264

(Continued)

OTHER PUBLICATIONS

Suvo Mittra, "Iolus: a Framework for Scalable Secure Multicasting", SIGCOMM '97, 1997, (pp. 1-12).
(Continued)

*Primary Examiner* — David J Pearson
*Assistant Examiner* — Badri Champakesen
(74) *Attorney, Agent, or Firm* — Oblon, McClelland, Maier & Neustadt, L.L.P.

(57) ABSTRACT

Plurality of users share a common key while permitting dynamic member change and computational complexity required for key exchange is reduced. The first key generation unit computes $R_i$ and $c_i$ based on a twisted pseudo-random function. A session ID generation unit generates sid based on a target-collision resistant hash function and transmits (sid, $R_\alpha$, $R_\beta$) to communication devices $U_i$. A second key generation unit of a representative communication device $U_1$ computes $T_1$ based on a pseudo-random function.

(Continued)

A second key generation unit of general communication devices $U_j$ computes $T_j$ based on the pseudo-random function. A third key generation unit computes k' based on the twisted pseudo-random function and computes $T'_j$ with respect to each j. A session key generation unit of the general communication devices $U_j$ computes $K_j^1$ and $k_1$. The session key generation unit generates a common key $K_2$ based on the pseudo-random function.

8 Claims, 4 Drawing Sheets

(58) Field of Classification Search
USPC .......................................................... 713/171
See application file for complete search history.

(56) References Cited

U.S. PATENT DOCUMENTS

| | | | | |
|---|---|---|---|---|
| 7,434,046 | B1* | 10/2008 | Srivastava | H04L 9/0825 380/264 |
| 2005/0097317 | A1* | 5/2005 | Trostle | H04L 9/0833 713/163 |
| 2006/0168446 | A1* | 7/2006 | Ahonen | H04L 9/0822 713/163 |
| 2007/0297613 | A1* | 12/2007 | Ghosh | H04L 9/0836 380/277 |
| 2008/0123856 | A1* | 5/2008 | Won | H04L 9/0833 380/277 |
| 2009/0177894 | A1* | 7/2009 | Orsini | G06F 21/6209 713/193 |
| 2010/0142704 | A1* | 6/2010 | Camenisch | H04L 9/0847 380/44 |
| 2010/0278336 | A1* | 11/2010 | Tahan | G06F 21/606 380/46 |
| 2012/0002816 | A1* | 1/2012 | Tian | H04L 9/0822 380/270 |
| 2012/0057697 | A1* | 3/2012 | Holtmanns | H04L 9/0838 380/42 |
| 2012/0166818 | A1* | 6/2012 | Orsini | H04L 9/085 713/193 |
| 2013/0013931 | A1* | 1/2013 | O'Hare | H04L 9/0822 713/189 |
| 2013/0054964 | A1* | 2/2013 | Messerges | H04L 9/0833 713/163 |
| 2013/0083926 | A1* | 4/2013 | Hughes | H04L 9/0836 380/278 |
| 2013/0305039 | A1* | 11/2013 | Gauda | G06F 21/6218 713/153 |
| 2014/0140511 | A1* | 5/2014 | Suh | H04L 9/0836 380/273 |
| 2014/0229731 | A1* | 8/2014 | O'Hare | G06F 21/6218 713/165 |
| 2015/0222619 | A1* | 8/2015 | Hughes | H04L 63/08 713/168 |
| 2017/0187524 | A1* | 6/2017 | Furukawa | H04L 9/08 |

OTHER PUBLICATIONS

International Search Report dated Jul. 19, 2016 in PCT/JP2016/062601 filed Apr. 21, 2016.
Suvo Mittra, "Iolus: a Framework for Scalable Secure Multicasting", SIGCOMM '97, 1997, (pp. 1-12).
A. Ballardie, "Scalable Multicast Key Distribution", [online], [retrieved on Mar. 4, 2016], Internet URL:https://tools.ietf.org/html/rfc.1949, Network Working Group, RFC 1949, May 1996, (18 pages).
Oded Goldreich, "Modern Cryptography, Probabilistic Proofs and Pseudo-randomness", Springer-Verlag Tokyo Inc., 2001, (3 pages) (with English translation).
Johannes A. Buchmann, "Introduction to Cryptography the original $3^{rd}$ edition, Chapter 11 Cryptographic Hash Functions", Maruzen Publishing Co. Ltd, 2007, (10 pages) (with English translation).
Dan Boneh, et al., "Functional Encryption: Definitions and Challenges," TCC, Lecture Notes in Computer Science, vol. 6597, 2011, (24 pages).
Kazuki Yoneyama, "One-Round Authenticated Key Exchange with Strong Forward Secrecy in the Standard Model against Constrained Adversary", IEICE Trans. Fundamentals, vol. E96-A, No. 6, Jun. 2013, (pp. 1124-1138).
International Search Report dated Jul. 19, 2016 in PCT/JP2016/062601 filed Apr. 21, 2016 Considered.

* cited by examiner

KEY EXCHANGE METHOD, KEY EXCHANGE SYSTEM, KEY DISTRIBUTION DEVICE, COMMUNICATION DEVICE, AND PROGRAM

TECHNICAL FIELD

The present invention relates to an application of an information security technology, and especially relates to a key exchange technology by which a plurality of users forming a group share a common key.

BACKGROUND ART

Key exchange technologies by which a plurality of users forming a group share a common key have been conventionally proposed (see Non-patent Literatures 1 and 2, for example). Non-patent Literature 1 describes an architecture of an information system for realizing such key exchange technology. Non-patent Literature 2 describes an algorithm of such key exchange technology.

PRIOR ART LITERATURE

Non-Patent Literature

Non-patent Literature 1: Suvo Mittra, "Iolus: a framework for scalable secure multicasting", SIGCOMM '97, pp. 277-288

Non-patent Literature 2: "Scalable Multicast Key Distribution", [online], [retrieved on Jun. 5, 2015], internet <URL:https://tools.ietf.org/html/rfc1949>

SUMMARY OF THE INVENTION

Problems to be Solved by the Invention

In the related-art technologies described in Non-patent Literatures 1 and 2, users who share a common key need to be registered in advance, so that it is impossible for a plurality of users to share the common key while permitting dynamic member change. Further, since the whole computational complexity required for key exchange is O(log n) when the number of users is denoted as n, there is a problem in that the computational complexity for the key exchange is increased along with increase of the number of users.

In the light of such point, an object of the present invention is to provide a key exchange technology which enables a plurality of users to share a common key while permitting dynamic member change and enables reduction in computational complexity required for key exchange.

Means to Solve the Problems

In order to solve the above-mentioned problems, in a key exchange method according to the present invention, n denotes an integer which is 2 or larger, i denotes respective integers from 1 to n inclusive, j denotes respective integers from 2 to n inclusive, S denotes a key distribution device, $U_i$ denotes n pieces of communication devices, $U_1$ denotes one piece of representative communication device which is selected from the n pieces of communication devices $U_i$, $U_j$ denotes n−1 pieces of general communication devices obtained by excluding the representative communication device $U_1$ from the n pieces of communication devices $U_i$, $\|$ denotes a concatenation operator, $\alpha$ and $\beta$ denote integers defined by the following formulas:

$$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases},$$

a secret key $sk_S$ and secret strings $st_S$ and $st'_S$ for public key encryption of the key distribution device S are stored in a storage of the key distribution device S, and a secret key $sk_i$ and secret strings $st_i$ and $st'_i$ for public key encryption of the communication devices $U_i$ are stored in a storage of the communication devices $U_i$. The key exchange method includes: a first key generation step in which the communication devices $U_i$ generate $r_i$, $k_i$, and $s_i$ by using the secret strings $st_i$ and $st'_i$ based on a twisted pseudo-random function, compute $R_i = g^{r_i}$ and $c_i = g^{k_i} h^{s_i}$, and transmit $(R_i, c_i)$ to the key distribution device S; a session ID generation step in which the key distribution device S generates sid by using $c_1, \ldots, c_n$ based on a target-collision resistant hash function and transmits (sid, $R_\alpha$, $R_\beta$) to the communication devices $U_i$ with respect to each i; a representative second key generation step in which the representative communication device $U_1$ generates $K_1^l$ by using (sid, $R_n^{r_1}$) based on a pseudo-random function, computes $T_1$ by an exclusive OR of $K_1^l$ and $k_1 \| s_1$, and transmits $T_1$ to the key distribution device S; a general second key generation step in which the general communication devices $U_j$ generate $K_j^l$ by using (sid, $R_\alpha^{r_j}$) based on the pseudo-random function, generate $K_j^r$ by using (sid, $R_\beta^{r_j}$) based on the pseudo-random function, compute $T_j$ by an exclusive OR of $K_j^l$ and $K_j^r$, and transmit $(k_j, s_j, T_j)$ to the key distribution device S; a third key generation step in which the key distribution device S generates $k_s$ by using the secret strings $st_S$ and $st'_S$ based on the twisted pseudo-random function, computes k' by an exclusive OR of $k_2, \ldots, k_n, k_s$, computes $T'_j$ by an exclusive OR of $T_1, \ldots, T_{j-1}$ with respect to each j, transmits k' to the representative communication device $U_1$, and transmits (k', $T'_j$, $T_1$) to the general communication devices $U_j$; a first session key generation step in which the general communication devices $U_j$ compute $K_j^l$ by an exclusive OR of $T'_j$ and $K_j^r$ and compute $k_1 \| s_1$ by an exclusive OR of $T_1$ and $K_j^l$; and a second session key generation step in which the communication devices $U_i$ generate a common key $K_2$ by using sid and an exclusive OR of k' and $k_1$ based on the pseudo-random function.

Effects of the Invention

According to the present invention, a plurality of users can share a common key while permitting dynamic member change. Computational complexity required for key exchange is the predetermined number of times which is the number of users, that is, O(1), thus being reduced more than the related art.

DETAILED DESCRIPTION OF THE EMBODIMENT

Figure 1:
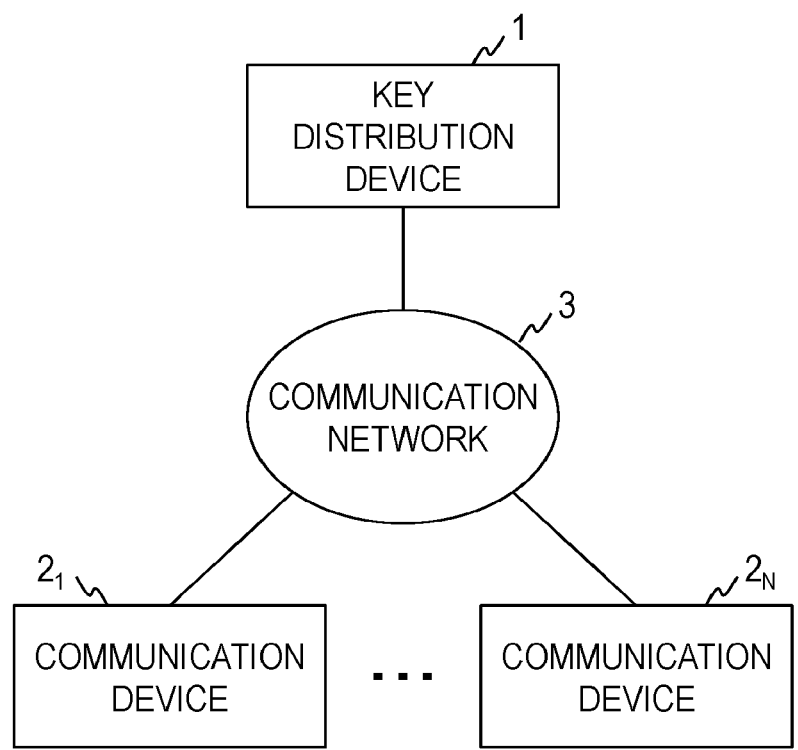
FIG. 1 is a diagram illustrating the functional configuration of a key exchange system.

Prior to the description of an embodiment, the notation in this specification will be described.

To select an element in at random from Set which is a certain set is expressed as m∈$_R$Set.

To output y based on ALG, which is a certain algorithm, with respect to an input x and a random number r is expressed as y←ALG(x;r). Here, in the case where ALG is a deterministic algorithm, the random number r is nil.

|•| denotes the bit length of a value.

κ denotes a security parameter.

F={F$_κ$: Dom$_κ$×FS$_κ$→Rng$_κ$}$_κ$ is a family of functions including a definition range {Dom$_κ$}$_κ$, a key space {FS$_κ$}$_κ$, and a value range {Rng$_κ$}$_κ$. In this case, if a function F$_κ$ and a true random function RF$_κ$: Dom$_κ$→Rng$_κ$ cannot be distinguished with respect to a person D to be identified at arbitrary polynomial time, F={F$_κ$}$_κ$ is called a family of pseudo-random functions. A specific example of the pseudo-random function is described in Reference Literature 1 below, for example.

[Reference Literature 1] O. Goldreich, "Modern Cryptography, Probabilistic Proofs and Pseudo-randomness", Springer-Verlag Tokyo, 2001

H={H$_κ$: Dom$_κ$→Rng$_κ$}$_κ$ is a family of hash functions including the definition range {Dom$_κ$}$_κ$ and the value range {Rng$_κ$}$_κ$. In this case, if x' (≠x) which satisfies H$_κ$(x)=H$_κ$(x') when x∈$_R$Dom$_κ$ is provided cannot be found with respect to an attacker A at arbitrary polynomial time, H={H$_κ$}$_κ$ is called a family of target-collision resistant hash functions. A specific example of the target-collision resistant hash function is described in Reference Literature 2 below, for example.

[Reference Literature 2] J. A. Buchmann, "Introduction to Cryptography—Edition 3", Maruzen Publishing Co., Ltd., 2007

Public key encryption algorithms are defined as (Gen, Enc, Dec). In a key generation algorithm Gen, a security parameter κ is an input and a public key pk and a secret key sk are outputs. In an encryption algorithm Enc, the public key pk and a plaintext in are inputs and a cipher text CT is an output. In the decryption algorithm Dec, the secret key sk and the cipher text CT are inputs and the plaintext in is an output. A specific example of the public key encryption algorithm is described in Reference Literature 2 mentioned above, for example.

Message authentication code algorithms are defined as (MGen, Tag, Ver). In a MAC key generation algorithm MGen, the security parameter κ is an input and a MAC key ink is an output. In the tag generation algorithm Tag, the MAC key ink and the plaintext m are inputs and an authentication tag a is an output. In a verification algorithm Ver, the MAC key ink, the plaintext in, and the authentication tag σ are inputs, and 1 is outputted when the authentication tag σ is correct, while 0 is outputted when the authentication tag σ is incorrect. A specific example of the message authentication code algorithm is described in Reference Literature 2 mentioned above, for example.

Functional encryption algorithms are defied as (Setup, Der, FEnc, FDec). In a setup algorithm Setup, the security parameter κ is an input and a master secret key msk and a public parameter Params are outputs. In a key derivation algorithm Der, the public parameter Params, the master secret key msk, and attribution A are inputs and a user secret key usk is an output. In an encryption algorithm FEnc, the public parameter Params, an access structure P, and the plaintext in are inputs and the cipher text CT is an output. In a decryption algorithm FDec, the user secret key usk and the cipher text CT are inputs and the plaintext in is outputted if the attribution A satisfies the access structure P. A specific example of the functional encryption algorithm is described in Reference Literature 3 below, for example.

[Reference Literature 3] D. Boneh, A. Sahai, and B. Waters, "Functional encryption: definitions and challenges", TCC, Lecture Notes in Computer Science, vol. 6597, pp. 253-273, 2011.

A function tPRF: $\{0, 1\}^κ×FS_κ×\{0, 1\}^κ×FS_κ→Rng_κ$ is called a twisted pseudo-random function, and $$tPRF(a,a',b,b'):=F_κ(a,b)⊕F_κ(b',a')$$

is defined by using the pseudo-random function F$_κ$. Here, a, b'∈$\{0, 1\}^κ$ and a', b∈FS$_κ$ hold. A specific example of the twisted pseudo-random function is described in Reference Literature 4 below, for example.

[Reference Literature 4] Kazuki Yoneyama, "One-Round Authenticated Key Exchange with Strong Forward Secrecy in the Standard Model against Constrained Adversary", IEICE Transactions, vol. E96-A, no. 6, pp. 1124-1138, 2013.

An embodiment of the present invention will be detailed below. Here, components having identical functions in the drawings will be denoted by identical reference characters and duplicate description thereof will be omitted.

As illustrated in FIG. 1, a key exchange system according to the embodiment includes a key distribution device 1 and N (≥2) pieces of communication devices 2$_1$, . . . , 2$_N$. In this embodiment, the key distribution device 1 and the communication devices 2$_1$, . . . , 2$_N$ are respectively connected to a communication network 3. The communication network 3 is a communication network adopting the circuit switching system or the packet switching system and configured so that the key distribution device 1 can communicate with each of the communication devices 2$_1$, . . . , 2$_N$. In this embodiment, the communication devices 2$_1$, . . . , 2$_N$ do not have to be able to communicate with each other. The communication network 3 does not have to be a communication path in which safety is ensured but an internet or the like, for example, can be employed.

Figure 2:
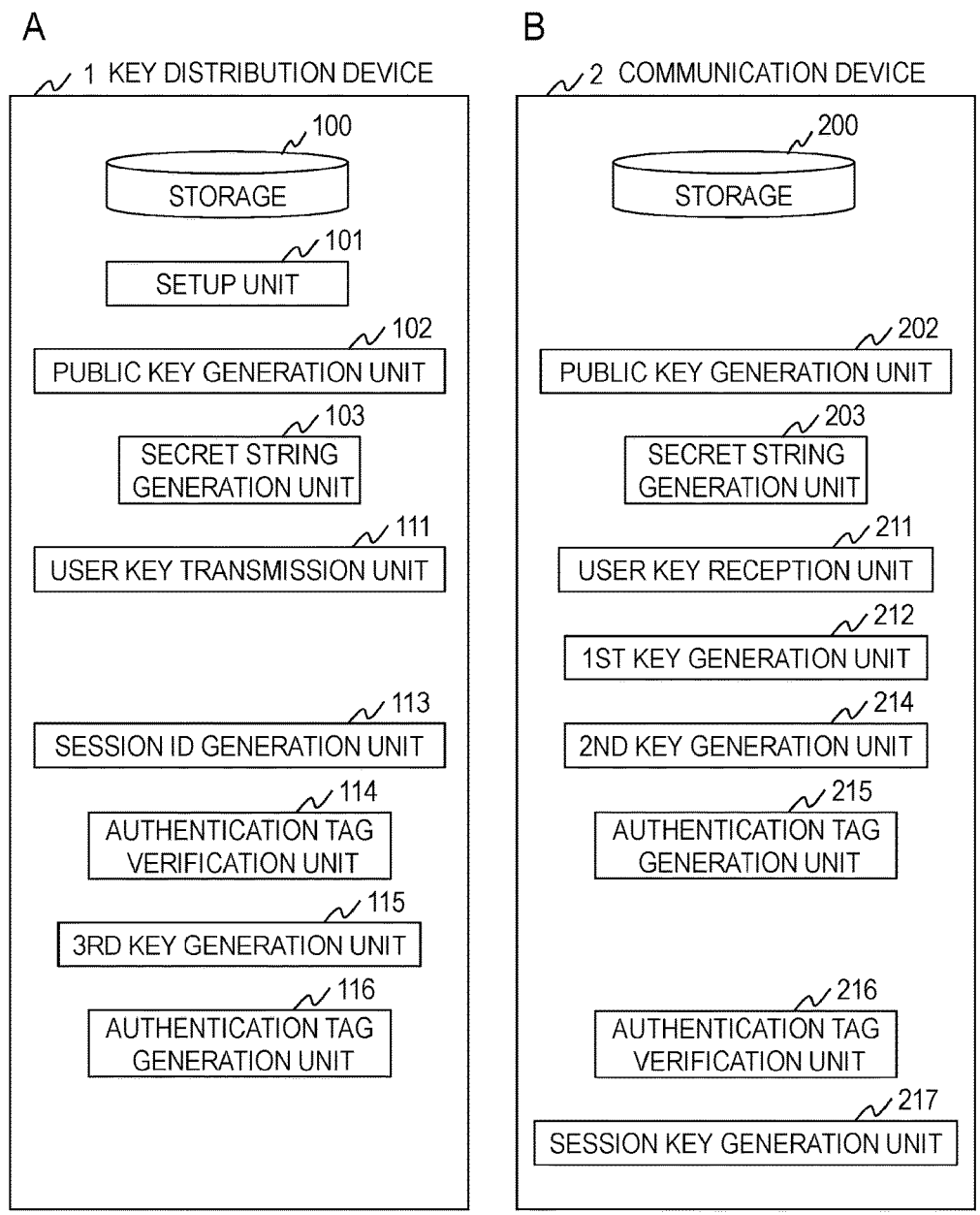
FIG. 2A is a diagram illustrating the functional configuration of a key distribution device.
FIG. 2B is a diagram illustrating the functional configuration of a communication device.

The key distribution device 1 includes a storage 100, a setup unit 101, a public key generation unit 102, a secret string generation unit 103, a user key transmission unit 111, a session ID generation unit 113, an authentication tag verification unit 114, a third key generation unit 115, and an authentication tag generation unit 116, as illustrated in FIG. 2(A). The communication device 2 includes a storage 200, a public key generation unit 202, a secret string generation unit 203, a user key reception unit 211, a first key generation unit 212, a second key generation unit 214, an authentication tag generation unit 215, an authentication tag verification unit 216, and a session key generation unit 217, as illustrated in FIG. 2(B). The key distribution device 1 and the communication devices 2$_1$, . . . , 2$_N$ perform processing of each step illustrated in FIGS. 3 and 4, realizing the key exchange method according to the embodiment.

The key distribution device 1 and the communication devices 2$_1$, . . . , 2$_N$ are special devices which are configured such that a special program is read into well-known or dedicated computers including a central processing unit (CPU), a main storage device (random access memory: RAM), and the like. Each device executes processing under the control of the central processing unit, for example. Data inputted into each device and data obtained through each processing are stored in the main storage device, for example, and the data stored in the main storage device is read onto the central processing unit as appropriate to be used for other processing. At least part of processing units included in each device may be composed of hardware such as an integrated circuit.

The storage 100 included in the key distribution device 1 and the storage 200 included in the communication devices $2_1, \ldots, 2_N$ may be composed of a main storage device such as a random access memory (RAM), an auxiliary storage device composed of a hard disk, an optical disk, or a semiconductor memory element such as a flash memory, or middleware such as a relational database and a key value store, for example. Since each storage stores secret information, each storage is preferably a storage device having tamper resistance (a SIM card, for example).

Figure 3:
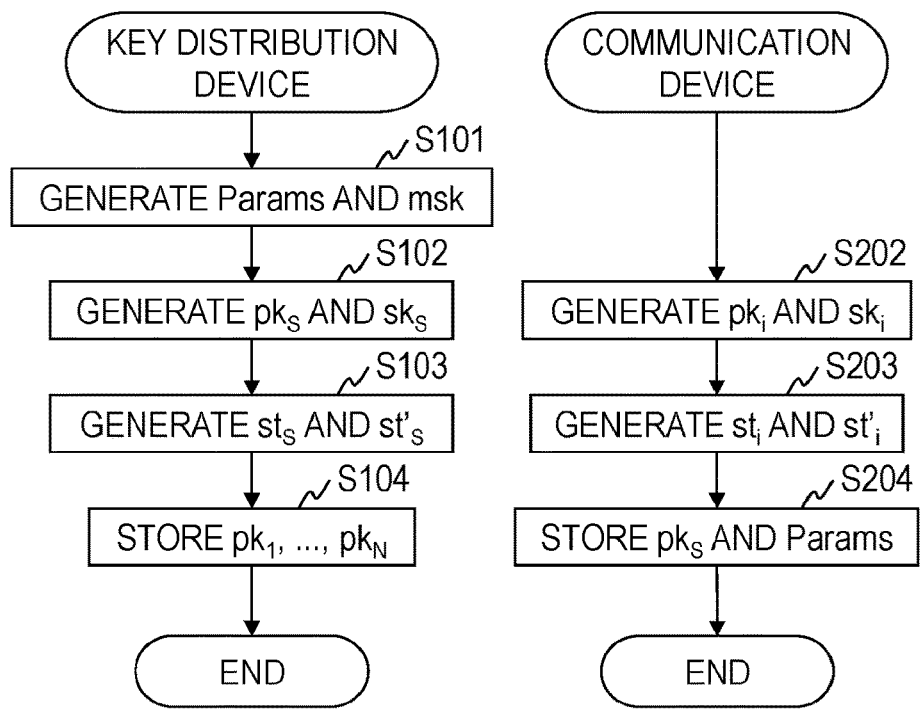
FIG. 3 is a diagram illustrating a processing flow in a key exchange method.

A processing procedure for system setup in the key exchange method according to the embodiment will be described with reference to FIG. 3.

In the following description, symbols will be defined as the following. S denotes the key distribution device 1 and $U_i$ ($i \in \{1, \ldots, N\}$) denotes N pieces of communication devices $2_1, \ldots, 2_N$. G denotes a multiplication cyclic group of a prime number order p of $\kappa$ bits. Each of g and h denotes a generation source of the group G. H: $\{0, 1\}^* \to \{0, 1\}^\kappa$ denotes a target-collision resistant hash function. tPRF: $\{0, 1\}^\kappa \times FS_\kappa \{0, 1\}^\kappa \times FS_\kappa \to Z_p$ and tPRF': $\{0, 1\}^\kappa \times FS_\kappa \times \{0, 1\}^\kappa \times FS_\kappa \to FS_\kappa$ denote twisted pseudo-random functions. F: $\{0, 1\}^\kappa \times G \to Z_p^2$, F': $\{0, 1\}^\kappa \times Z_p \to FS_\kappa$, and F'': $\{0, 1\}^\kappa \times FS_\kappa \to \{0, 1\}^\kappa$ denote pseudo-random functions.

In step S101, the setup unit 101 of the key distribution device S generates the public parameter Params and the master secret key msk based on the setup algorithm Setup for functional encryption. The setup unit 101 transmits the public parameter Params to each of the communication devices $U_1, \ldots, U_N$. The master secret key msk is stored in the storage 100.

In step S102, the public key generation unit 102 of the key distribution device S generates a combination of the public key $pk_S$ and the secret key $sk_S$ of the key distribution device S based on the key generation algorithm Gen for public key encryption. The public key $pk_S$ of the key distribution device S is made public by using a public key infrastructure or the like, for example. The secret key $sk_S$ of the key distribution device S is stored in the storage 100.

In step S202, the public key generation unit 202 of the communication devices $U_i$ generates a combination of the public key $pk_i$ and the secret key $sk_i$ of the communication devices $U_i$ based on the key generation algorithm Gen for public key encryption. The public key $pk_i$ of the communication devices $U_i$ is made public by using a public key infrastructure or the like, for example. The secret key $sk_i$ of the communication devices $U_i$ is stored in the storage 200.

In step S103, the secret string generation unit 103 of the key distribution device S generates secret strings $(st_S, st'_S)$ used in the twisted pseudo-random function as $st_S \in_R FS_\kappa$ and $st'_S \in \{0, 1\}_\kappa$. The secret strings $(st_S, st'_S)$ are stored in the storage 100.

In step S203, the secret string generation unit 203 of the communication devices $U_i$ generates secret strings $(st_i, st'_i)$ used in the twisted pseudo-random function as $st_i \in_R FS_\kappa$ and $st'_i \in \{0, 1\}_\kappa$. The secret strings $(st_i, st'_i)$ are stored in the storage 200.

In step S104, the key distribution device S acquires public keys $pk_1, \ldots, pk_N$ of respective communication devices $U_1, \ldots, U_N$ from a public key infrastructure or the like, for example, so as to store the public keys $pk_1, \ldots, pk_N$ in the storage 100.

In step S204, the communication devices $U_i$ acquire the public key $pk_S$ of the key distribution device S from a public key infrastructure or the like, for example, so as to store the public key $pk_S$ in the storage 200. Further, the public parameter Params which is received from the key distribution device S is stored in the storage 200.

Figure 4:
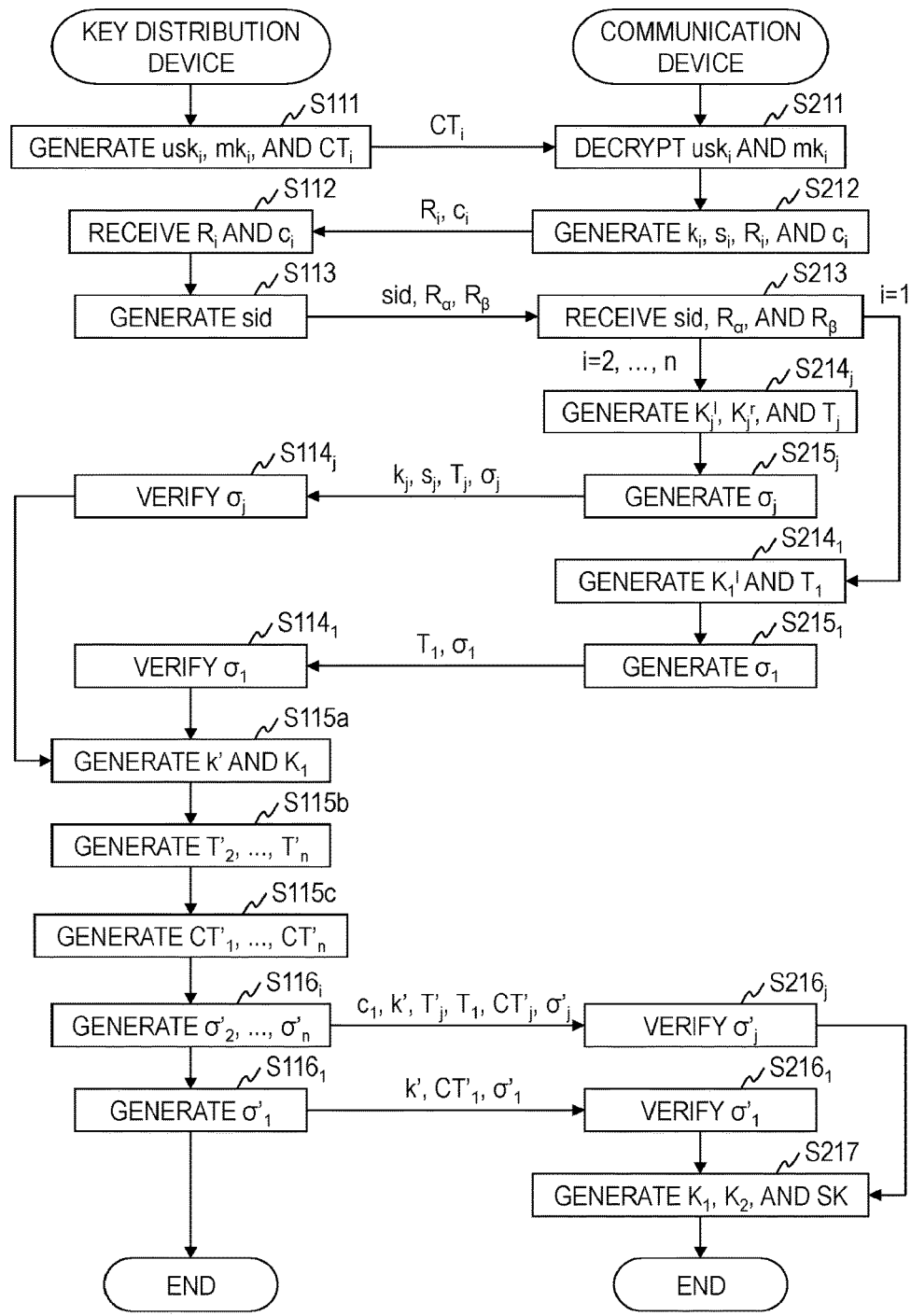
FIG. 4 is a diagram illustrating a processing flow in the key exchange method.

A processing procedure for session key distribution in the key exchange method according to the embodiment will be described with reference to FIG. 4.

It is assumed below that arbitrary n ($\leq N$) pieces of communication devices $U_i$ ($i \in \{1, \ldots, n\}$) among N pieces of communication devices $2_1, \ldots, 2_N$ share a session key SK. Further, in the case where S and $U_i$ are inputs of each algorithm, S and $U_i$ are identifiers for uniquely specifying respective devices.

In step S111, in the case where a session is started by the communication devices $U_i$ and the session is the first session in a time frame TF of the communication devices $U_i$, the user key transmission unit 111 of the key distribution device S generates a user secret key $usk_i \leftarrow \text{Der}(\text{Params}, \text{msk}, A_i)$ of the communication devices $U_i$ based on the key derivation algorithm Der for functional encryption with current time and attribution respectively set as time and $A_i = (U_i, \text{time})$. Further, a MAC key $mk_i \leftarrow \text{MGen}$ of the communication devices $U_i$ is generated based on the key generation algorithm MGen for a message authentication code. Then, the user secret key $usk_i$ and the MAC key $mk_i$ are encrypted by using the public key $pk_i$ of the communication devices $U_i$ based on the encryption algorithm Enc for public key encryption so as to generate the cipher text $CT_i \leftarrow \text{Enc}_{pki}(usk_i, mk_i)$. The user key transmission unit 111 transmits the cipher text $CT_i$ to each of the communication devices $U_i$.

In step S211, the user key reception unit 211 of the communication devices $U_i$ decrypts the cipher text $CT_i$, which is received from the key distribution device S, by using the secret key $sk_i$ of the communication devices $U_i$ based on the decryption algorithm Dec for public key encryption so as to obtain a user secret key and a MAC key $(usk_i, mk_i) \leftarrow \text{Dec}_{ski}(CT_i)$. The user key reception unit 211 stores the user secret key $usk_i$ and the MAC key $mk_i$ in the storage 200.

In step S212, the first key generation unit 212 of the communication devices $U_i$ generates $\sim r_i \in_R \{0, 1\}^\kappa$, $\sim r'_i \in_R FS_\kappa$, $\sim k_i \in_R \{0, 1\}^\kappa$, $\sim k'_i \in_R FS_\kappa$, $\sim s_i \in_R \{0, 1\}^\kappa$, and $\sim s'_i \in_R FS_\kappa$ and computes $r_i = \text{tPRF}(\sim r_i, \sim r'_i, st_i, st'_i)$, $k_i = \text{tPRF}(\sim k_i, \sim k'_i, st_i, st'_i)$ and $s_i = \text{tPRF}(\sim s_i, \sim s'_i, st_i, st'_i)$ based on the twisted pseudo-random function tPRF. Further, $R_i = g^{r_i}$ and $c_i = g^{k_i} h^{s_i}$ are computed. Then, the first key generation unit 212 transmits $(R_i, c_i)$ to the key distribution device S.

In step S112, the key distribution device S receives $(R_i, c_i)$ from the communication devices $U_i$. At this time, the key distribution device S stands by until the key distribution device S receives $(R_1, c_1), (R_n, c_n)$ respectively from all of the communication devices $U_1, \ldots, U_n$.

In step S113, the session ID generation unit 113 of the key distribution device S generates $sid = H(c_1, c_n)$ by using $c_1, \ldots, c_n$, which are respectively received from the communication devices $U_1, \ldots, U_n$, based on the target-collision resistant hash function H. Further, one piece of communication device is selected as a representative from n pieces of communication devices $U_1, \ldots, U_n$. A method for selecting a representative is arbitrary. For example, a predetermined communication device with the highest priority or a communication device which has started a session most recently may be selected. It is assumed that the communication device $U_1$ is selected, and $U_1$ is called a representative communication device, here. Further, n−1 pieces of communication devices $U_j$ ($j \in \{2, \ldots, n\}$) other than the representative communication device $U_i$ are called general communication devices. The session ID generation unit 113 computes α and β as the following formulas and transmits (sid, $R_\alpha$, $R_\beta$) to each of the communication devices $U_i$.

$$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases}$$

In step S213, each of the communication devices $U_i$ receives (sid, $R_\alpha$, $R_\beta$) from the key distribution device S. The communication devices $U_i$ execute the following processing as soon as the communication devices $U_i$ receive (sid, $R_\alpha$, $R_\beta$). In the case where i=2, . . . , n holds, that is, the case where the communication devices $U_i$ are the communication devices $U_j$ (i=j), the processing is progressed to step S214$_j$. In the case where i=1 holds, that is, the case where the communication device $U_i$ is the representative communication device $U_1$, the processing is progressed to step S214$_1$.

In step S214$_j$, the second key generation unit 214 of the general communication devices $U_j$ generates $K_j^l$ by using (sid, $R_\alpha^{rj}$) based on the pseudo-random function F and generates $K_j^r$ by using (sid, $R_\beta^{rj}$) based on the pseudo-random function F so as to compute $T_j$ by an exclusive OR of $K_j^l$ and $K_j^r$, as the following formulas.

$$K_j^l = F(sid, R^{rj}_\alpha),$$

$$K_j^r = F(sid, R^{rj}_\beta),$$

$$T_j = K_j^l \oplus K_j^r$$

In step S215$_1$ the authentication tag generation unit 215 of the general communication devices $U_j$ generates an authentication tag $\sigma_j = \text{Tag}_{mkj}(R_j, c_j, R_\alpha, R_\beta, k_j, s_j, T_j, U_j, sid)$ by using the MAC key $mk_j$ based on the tag generation algorithm Tag for a message authentication code. The authentication tag generation unit 215 transmits ($k_j$, $s_j$, $T_j$, $\sigma_j$) to the key distribution device S.

In step S214$_1$, the second key generation unit 214 of the representative communication device $U_1$ generates $K_1^l$ by using (sid, $R_n^{r1}$) based on the pseudo-random function F so as to compute $T_1$ by an exclusive OR of $K_1^l$ and $k_1 \| s_1$, as the following formulas. Here, $\|$ denotes a concatenation operator.

$$K_1^l = F(sid, R_n^{r1}),$$

$$T_1 = K_1^l \oplus k_1 \| s_1$$

In step S215$_1$, the authentication tag generation unit 215 of the representative communication device $U_i$ generates an authentication tag $\sigma_1 = \text{Tag}_{mk1}(R_1, c_1, R_n, R_2, T_1, U_1, sid)$ by using the MAC key $mk_1$ based on the tag generation algorithm Tag for a message authentication code. The authentication tag generation unit 215 transmits ($T_1$, $\sigma_1$) to the key distribution device S.

In step S114$_j$, the authentication tag verification unit 114 of the key distribution device S receives ($k_j$, $s_j$, $T_j$, $\sigma_j$) from the general communication devices $U_j$ with respect to j=2, n and verifies $\text{Ver}_{mkj}(R_j, c_j, R_\alpha, R_\beta, k_j, s_j, T_j, U_j, sid, \sigma_j)$ by using the MAC key $mk_j$ of the general communication devices $U_j$ based on the verification algorithm Ver for a message authentication code. When the authentication tag $\sigma_j$ is invalid, the session of the general communication devices $U_j$ is ended. Further, whether or not $c_j = g^{kj} h^{sj}$ is satisfied with respect to j=2, . . . , n is verified. When $c_j = g^{kj} h^{sj}$ is not satisfied, the session of the general communication devices $U_j$ is ended.

In step S114$_1$, the authentication tag verification unit 114 of the key distribution device S receives ($T_1$, $\sigma_1$) from the representative communication device $U_1$ and verifies $\text{Ver}_{mk1}(R_1, c_1, R_n, R_2, T_1, U_1, sid, \sigma_1)$ by using the MAC key $mk_1$ of the representative communication device $U_1$ based on the verification algorithm Ver for a message authentication code. When the authentication tag $\sigma_1$ is invalid, the session of the representative communication device $U_1$ is ended.

In step S115a, the third key generation unit 115 of the key distribution device S generates $\sim k_S \in_R \{0, 1\}^\kappa$, $\sim k'_S \in_R FS_\kappa$, $\sim K_1 \in_R \{0, 1\}^\kappa$, and $\sim K'_1 \in_R FS_\kappa$ so as to compute $k_S = \text{tPRF}(\sim k_S, \sim k'_S, st_S, st'_S)$ and $K_1 = \text{tPRF}(\sim K_1, \sim K'_1, st_S, st'_S)$ based on the twisted pseudo-random function tPRF. Further, k' is computed by the following formula.

$$k' = (\oplus_{2 \leq j \leq n} k_j) \oplus k_S$$

In step S115b, the third key generation unit 115 of the key distribution device S computes $T'_j$ with respect to j=2, . . . , n by the following formula.

$$T'_j = \oplus_{1 \leq i \leq j-1} T_i$$

In step S115c, the third key generation unit 115 of the key distribution device S encrypts a common key $K_1$ with respect to i=1, . . . , n based on the encryption algorithm FEnc for functional encryption with the access structure $P_i = (ID = U_i) \wedge (time \in TF)$ so as to generate a cipher text $CT'_i = FEnc(Params, P_i, K_1)$. Here, ID is a predicate variable representing a communication device and TF is a predicate variable representing a time frame of the communication device.

In step S116$_j$, the authentication tag generation unit 116 of the key distribution device S generates an authentication tag $\sigma'_j = \text{Tag}_{mkj}(R_j, c_j, R_\alpha, R_\beta, k_j, s_j, T_j, U_j, sid, c_1, k', T'_j, T_1, CT'_j)$ with respect to j=2, n by using the MAC key $mk_j$ of the general communication devices $U_j$ based on the tag generation algorithm Tag for a message authentication code. The authentication tag generation unit 116 transmits ($c_1$, k', $T'_j$, $T_1$, $CT'_j$, $\sigma'_j$) to the general communication devices $U_j$.

In step S116$_1$, the authentication tag generation unit 116 of the key distribution device S generates an authentication tag $\sigma'_1 = \text{Tag}_{mk1}(R_1, c_1, R_n, R_2, T_1, U_1, sid, k', CT'_1)$ by using the MAC key $mk_1$ of the representative communication device $U_i$ based on the tag generation algorithm Tag for a message authentication code. The authentication tag generation unit 116 transmits (k', $CT'_1$, $\sigma'_1$) to the representative communication device $U_1$.

In step S216$_j$, the authentication tag verification unit 216 of the general communication devices $U_j$ receives ($c_1$, k', $T'_j$, $T_1$, $CT'_j$, $\sigma'_j$) from the key distribution device S and verifies $\text{Ver}_{mkj}(R_j, c_j, R_\alpha, R_\beta, k_j, s_j, T_j, U_j, sid, c_1, k', T'_j, T_1, CT'_j, \sigma'_j)$ by using the MAC key $mk_j$ of the general communication devices $U_j$ based on the verification algorithm Ver for a message authentication code. When the authentication tag $\sigma'_j$ is invalid, the session of the general communication devices $U_j$ is ended. Further, $K_j^l$ is computed by an exclusive OR of $T'_j$ and $K_j^r$ and $k_1 \| s_1$ is computed by an exclusive OR of $T_1$ and $K_j^l$ as the following formulas.

$$K_1^l = T'_j \oplus K_j^l,$$

$$k_1 \| s_1 = T_1 \oplus K_1^l$$

Then, whether or not $c_1 = g^{k1}h^{s1}$ is satisfied is verified. When $c_1 = g^{k1}h^{s1}$ is not satisfied, the session of the general communication devices $U_j$ is ended.

In step $S216_1$, the authentication tag verification unit 216 of the representative communication device $U_1$ receives (k', $CT'_1$, σ'$_1$) from the key distribution device S and verifies $Ver_{mk1}(R_1, c_1, R_n, R_2, T_1, U_1, sid, k', CT'_1, \sigma'_1)$ by using the MAC key $mk_1$ of the representative communication device $U_1$ based on the verification algorithm Ver for a message authentication code. When the authentication tag σ'$_1$ is invalid, the session of the representative communication device $U_1$ is ended.

In step S217, the session key generation unit 217 of the communication devices $U_i$ decrypts the common key $K_1 \leftarrow FDec_{uski}(CT'_i, P_i)$ by using the user secret key $usk_i$ of the communication devices $U_i$ based on the decryption algorithm FDec for functional encryption. Further, a common key $K_2$ is computed based on the pseudo-random function F' as the following formula.

$$K_2 = F'(sid, k' \oplus k_1)$$

Then, a session key SK is computed based on a pseudo-random function F'' as the following formula.

$$SK = F''(sid, K_1) \oplus F''(sid, K_2)$$

According to the key exchange technology of the present invention, the above-described configuration makes it unnecessary to preliminarily register information of users who perform key exchange as the related art, thus enabling a plurality of users to share a common key while permitting dynamic member change. Further, the whole computational complexity required for the key exchange has been O(log n) when the number of users is set as n in the related art, but according to the present invention, the whole computational complexity is the predetermined number of times which is the number of users, that is, O(1), enabling key exchange with smaller computational complexity than the related art.

It is obvious that the present invention is not limited to the above-described embodiment and alterations can be made as appropriate within a scope of the idea of the present invention. Various types of processing which are described in the above embodiment may be executed in time series in accordance with the described order and may be executed in parallel or individually in accordance with the processing capacity of the device performing the processing or in accordance with the need.

[Program and Recording Medium]

When various types of processing functions in the devices described in the above embodiment are implemented on a computer, the contents of processing function to be contained in each device is written by a program. With this program executed on the computer, various types of processing functions in the above-described devices are implemented on the computer.

This program in which the contents of processing are written can be recorded in a computer-readable recording medium. The computer-readable recording medium may be any medium such as a magnetic recording device, an optical disc, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit thereof, for example. When the processing is performed, the computer reads out the program stored in the recording medium thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program according to the present embodiment includes information which is provided for processing performed by electronic calculation equipment and which is equivalent to a program (such as data which is not a direct instruction to the computer but has a property specifying the processing performed by the computer).

In the present embodiment, the present device is configured with a predetermined program executed on a computer. However, the present device may be configured with at least part of these processing contents realized in a hardware manner.

What is claimed is:

1. A key exchange method, in which n denotes an integer which is 2 or larger, i denotes respective integers from 1 to n inclusive, j denotes respective integers from 2 to n inclusive, S denotes a key distribution device, $U_i$ denotes n pieces of communication devices, $U_1$ denotes one piece of representative communication device which is selected from the communication devices $U_i$, $U_j$ denotes n−1 pieces of general communication devices obtained by excluding the representative communication device $U_1$ from the communication devices $U_i$, ∥ denotes a concatenation operator, α and β denote integers defined by the following formulas:

$$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases},$$

the key exchange method comprising:

storing a secret key $sk_s$ and secret strings $st_s$ and $st'_s$ for public key encryption of the key distribution device S in a storage of the key distribution device S by circuitry of the key distribution device S;

storing a secret key $sk_i$ and secret strings $st_i$ and $st'_i$ for public key encryption of the communication devices $U_i$ in a storage of the communication devices $U_i$ by circuitry of the communication device $U_1$;

generating $r_i$, $k_i$, and $s_i$ by using the secret strings $st_i$ and $st'_i$ based on a twisted pseudo-random function, computing $R_i = g^{r_i}$ and $c_i = g^{k_i}h^{s_i}$, and transmitting ($R_i$, $c_i$) to the key distribution device S by the circuitry of the communication devices $U_i$, wherein the twisted pseudo-random function is tPRF: $\{0, 1\}^\kappa \times FS_\kappa \times \{0, 1\}^\kappa \times FS_\kappa \to Z_p$, F: $\{0, 1\}^\kappa \times G \to Z_p^2$ $r_i = \text{tPRF}(\sim r_i, \sim r'_i, st_i,$ st'$_i$), k$_i$=tPRF(~k$_i$, ~k'$_i$, st$_i$, st'$_i$) and s$_i$=tPRF(~s$_i$, ~s'$_i$, st$_i$, st'$_i$), and ~r$_i \in_R \{0, 1\}^\kappa$, ~r'$_i \in_R$FS$_\kappa$, ~k$_i \in_R \{0, 1\}^\kappa$, ~k'$_i \in_R$FS$_\kappa$, ~s$_i \in_R \{0, 1\}^\kappa$, and ~s'$_i \in_R$FS$_\kappa$, G denotes a multiplication cyclic group of a prime number order p of κ bits and each of g and h denotes a generation source of the group G;

generating sid by using c$_1$, . . . , c based on a target-collision resistant hash function and transmitting (sid, R$_\alpha$, R$_\beta$) to the communication devices U$_i$ with respect to each i by the circuitry of the key distribution device S;

generating K$_1^l$ by using (sid, R$_n^{r1}$) based on a pseudo-random function, computing T$_1$ by an exclusive OR of K$_1^l$ and k$_1$∥s$_1$, and transmitting T$_1$ to the key distribution device S by circuitry of the representative communication device U$_1$;

generating K$_j^l$ by using (sid, R$_\alpha^{rj}$) based on the pseudo-random function, generating K$_j^r$ by using (sid, R$_\beta^{rj}$) based on the pseudo-random function, computing T$_j$ by an exclusive OR of K$_j^l$ and K$_j^r$, and transmitting (k$_j$, s$_j$, T$_j$) to the key distribution device S by circuitry of the general communication devices U$_j$;

generating k$_s$ by using the secret strings st$_S$ and st'$_S$ based on the twisted pseudo-random function, computing k' by an exclusive OR of k$_2$, . . . , k$_n$, k$_s$, computing T'$_j$ by an exclusive OR of T$_1$, . . . , T$_{j-1}$ with respect to each j, transmitting k' to the representative communication device U$_1$, and transmitting (k', T'$_j$, T$_1$) to the general communication devices U$_j$ by the circuitry of the key distribution device S;

computing K$_j^l$ by an exclusive OR of T'$_j$ and K$_j^r$ and computing k$_1$∥s$_1$ by an exclusive OR of T$_1$ and K$_j^l$ by the circuitry of the general communication devices U$_j$; and generating a common key K$_2$, which is used by the communication devices Us to decrypt information multicast to the communication devices U$_i$, by using sid and an exclusive OR of k' and k$_1$ based on the pseudo-random function by the circuitry of the communication devices U$_i$.

2. The key exchange method according to claim 1, in which time denotes current time, ID denotes a predicate variable representing the communication device, and TF denotes a predicate variable representing a time frame of the communication device, the key exchange method further comprising:

storing a master secret key msk for functional encryption in the storage of the key distribution device S by the circuitry of the key distribution device S;

generating a user secret key usk$_i$ by using the master secret key msk with respect to each i with attribution used as A$_i$=(U$_i$, time) based on a key derivation algorithm for functional encryption, and encrypting the user secret key usk$_i$ by using a public key pk$_i$ of the communication devices U$_i$ based on an encryption algorithm for public key encryption so as to generate a cipher text CT$_i$ by circuitry of the key distribution device S;

decrypting the cipher text CT$_i$ by using the secret key sk$_i$ based on a decryption algorithm for public key encryption so as to obtain the user secret key usk$_i$ by circuitry of the communication devices U$_i$, wherein generating a common key K$_1$ by using the secret strings st$_S$ and st'$_S$ based on the twisted pseudo-random function, and encrypting the common key K$_1$ with respect to each i with an access structure P$_i$=(ID=U$_i$)∧(time∈TF) based on an encryption algorithm for functional encryption so as to generate a cipher text CT'$_i$ by circuitry of the key distribution device S; and decrypting the cipher text CT$_i$ by using the user secret key usk$_i$ based on a decryption algorithm for functional encryption so as to obtain the common key K$_1$ and computing a session key SK by an exclusive OR of a value generated by using (sid, K$_1$) based on the pseudo-random function and a value generated by using (sid, K$_2$) based on the pseudo-random function by circuitry of the communication devices U$_i$.

3. The key exchange method according to claim 2, the key exchange method further comprising:

generating a MAC key mk$_i$ based on a key generation algorithm for a message authentication code and the user secret key usk$_i$ and encrypting the MAC key mk$_i$ by using the public key pk$_i$ of the communication devices U$_i$ based on the encryption algorithm for public key encryption so as to generate the cipher text CT$_i$ by circuitry of the key distribution device S;

decrypting the cipher text CT$_i$ by using the secret key sk$_i$ based on the decryption algorithm for public key encryption so as to obtain the user secret key usk$_i$ and the MAC key mk$_i$ by circuitry of the communication devices U$_i$;

generating an authentication tag σ$_l$ by using the MAC key mk$_1$ and R$_1$, c$_i$, R$_n$, R$_2$, T$_1$, U$_1$, and sid based on a tag generation algorithm for a message authentication code by the circuitry of the representative communication device U$_1$;

generating an authentication tag σ$_1$ by using the MAC key mk$_j$ and R$_j$, c$_j$, R$_\alpha$, R$_\beta$, k$_j$, s$_j$, T$_j$, U$_j$, and sid based on the tag generation algorithm for a message authentication code by circuitry of the general communication devices U$_j$;

verifying the authentication tag al by using the MAC key mk$_1$ and R$_1$, c$_1$, R$_n$, R$_2$, T$_1$, U$_1$, and sid based on a verification algorithm for a message authentication code, verifying the authentication tag σ$_j$ with respect to each j by using the MAC key mk$_j$ and R$_j$, c$_j$, R$_\alpha$, R$_\beta$, k$_j$, s$_j$, T$_j$, U$_j$, and sid based on the verification algorithm for a message authentication code, and verifying whether or not c$_j$=g$^{kj}$h$^{sj}$ is satisfied by the circuitry of the key distribution device S;

generating an authentication tag σ'$_1$ by using the MAC key mk$_1$ and R$_1$, c$_1$, R$_n$, R$_2$, T$_1$, U$_1$, sid, k', and CT'$_1$ based on the tag generation algorithm for a message authentication code and generating an authentication tag σ'$_j$ with respect to each j by using the MAC key mk$_j$ and R$_j$, c$_j$, R$_\alpha$, R$_\beta$, k$_j$, s$_j$, T$_j$, U$_j$, sid, c$_1$, k', T'$_j$, T$_1$, and CT'$_j$ based on the tag generation algorithm for a message authentication code by the circuitry of the key distribution device S;

verifying the authentication tag σ'$_1$ by using the MAC key mk$_1$ and R$_1$, c$_1$, R$_n$, R$_2$, T$_1$, U$_1$, sid, k', and CT'$_1$ based on the verification algorithm for a message authentication code by the circuitry of the representative communication device U$_1$; and verifying the authentication tag σ'$_j$ by using the MAC key mk$_j$ and R$_j$, c$_j$, R$_\alpha$, R$_\beta$, k$_j$, s$_j$, T$_j$, U$_j$, sid, c$_1$, k', T'$_j$, T$_1$, and CT'$_j$ based on the verification algorithm for a message authentication code, computing K$_1^l$ by an exclusive OR of T'$_j$ and K$_j^l$, obtain k$_1$∥s$_1$ by an exclusive OR of T$_1$ and K$_1^l$, and verifying whether or not c$_1$=g$^{k1}$h$^{s1}$ is satisfied by the circuitry of the general communication devices U$_j$.

4. A key exchange system, in which n denotes an integer which is 2 or larger, i denotes respective integers from 1 to n inclusive, j denotes respective integers from 2 to n inclusive, II denotes a concatenation operator, and a and 3 denote integers defined by the following formulas:

$$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases},$$

the key exchange system comprising:
a key distribution device S; and
n pieces of communication devices $U_i$, the communication devices $U_i$ being composed of a representative communication device $U_1$ and n−1 pieces of general communication devices $U_j$, wherein
the key distribution device S comprising:
circuitry configured to:
store a secret key $sk_S$ and secret strings $st_S$ and $st'_S$ for public key encryption of the key distribution device S in a storage of the key distribution device S;
receive ($R_i$, $c_i$) from the communication devices $U_i$ with respect to each i, generates sid by using $c_1, \ldots, c_n$ based on a target-collision resistant hash function, and transmits (sid, $R_\alpha$, $R_\beta$) to the communication devices $U_i$ with respect to each i;
receive $T_1$ from the representative communication device $U_1$, receive ($k_j$, $s_j$, $T_j$) from the general communication devices $U_j$ with respect to each j, generate $k_s$ by using the secret strings $st_S$ and $st'_S$ based on a twisted pseudo-random function, compute k' by an exclusive OR of $k_2, \ldots, k_n, k_s$, compute $T'_j$ by an exclusive OR of $T_1, \ldots, T_{j-1}$ with respect to each j, transmit k' to the representative communication device $U_1$, and transmit (k', $T'_j$, $T_1$) to the general communication devices $U_j$,
the representative communication device $U_i$ comprising:
circuitry configured to:
store a secret key $sk_i$ and secret strings $st_1$ and $st'_1$ for public key encryption of the representative communication device $U_1$ in a storage of the representative communication device $U_1$;
generate $r_1$, $k_1$, and $s_1$ by using the secret strings $st_1$ and $st'_1$ based on the twisted pseudo-random function, computes $R_1 = g^{r1}$ and $c_1 = g^{k1}h^{s1}$, and transmits ($R_1$, $c_1$) to the key distribution device S, wherein the twisted pseudo-random function is tPRF: $\{0, 1\}^\kappa \times FS_\kappa \times \{0, 1\}^\kappa \times FS_\kappa \to Z_p$, F: $\{0, 1\}^\kappa \times G \to Z_p^2$ $r_i$=tPRF($\sim r_i$, $\sim r'_i$, $st_i$, $st'_i$), $k_i$=tPRF($\sim k_i$, $\sim k'_i$, $st_i$, $st'_i$) and $s_i$=tPRF($\sim s_i$, $\sim s'_i$, $st_i$, $st'_i$), and $\sim r_i \in_R \{0, 1\}^\kappa$, $\sim r'_i \in_R FS_\kappa$, $\sim k_i \in_R \{0, 1\}^\kappa$, $\sim k'_i \in_R FS_\kappa$, $\sim s_i \in_R \{0, 1\}^\kappa$, and $\sim s'_i \in_R FS_\kappa$, G denotes a multiplication cyclic group of a prime number order p of κ bits and each of g and h denotes a generation source of the group G;
receive (sid, $R_n$, $R_2$) from the key distribution device S, generate $K_1^l$ by using (sid, $R_n^{r1}$) based on the pseudo-random function, compute $T_1$ by an exclusive OR of $K_1^l$ and $k_1\|s_1$, and transmit $T_1$ to the key distribution device S, and
receive k' from the key distribution device S and generate a common key $K_2$ by using sid and an exclusive OR of k' and $k_1$ based on the pseudo-random function, and the general communication devices $U_j$ comprising:
circuitry configured to:
store a secret key $sk_j$ and secret strings $st_j$ and $st'_j$ for public key encryption of the general communication devices $U_j$ in a storage of the general communication devices $U_j$;
generate $r_j$, $k_j$, and $s_j$ by using the secret strings $st_j$ and $st'_j$ based on the twisted pseudo-random function, compute $R_j = g^{rj}$ and $c_j = g^{kk}h^{sj}$, and transmit ($R_j$, $c_j$) to the key distribution device S;
receive (sid, $R_\alpha$, $R_\beta$) from the key distribution device S, generate $K_j^l$ by using (sid, $R_\alpha^{rj}$) based on the pseudo-random function, generate $K_j^r$ by using (sid, $R_\beta^{rj}$) based on the pseudo-random function, compute $T_j$ by an exclusive OR of $K_j^l$ and $K_j^r$, and transmit ($k_j$, $s_j$, $T_j$) to the key distribution device S; and
receive (k', $T'_j$, $T_1$) from the key distribution device S, computes $K_j^l$ by an exclusive OR of $T'_j$ and $K_j^r$, compute $k_1\|s_1$ by an exclusive OR of $T_1$ and $K_j^l$, and generate the common key $K_2$, which is used by the communication devices $U_i$ to decrypt information multicast to the communication devices $U_i$, by using sid and an exclusive OR of k' and $k_1$ based on the pseudo-random function.

5. A communication device, in which n denotes an integer which is 2 or larger and ‖ denotes a concatenation operator, the communication device comprising:
circuitry configured to:
store a secret key $sk_1$ and secret strings $st_1$ and $st'_1$ for public key encryption in a storage;
generate $r_1$, $k_1$, and $s_1$ by using the secret strings $st_1$ and $st'_1$ based on a twisted pseudo-random function, compute $R_1 = g^{r1}$ and $c_1 = g^{k1}h^{s1}$, and transmit ($R_1$, $c_1$) to a key distribution device S, wherein the twisted pseudo-random function is tPRF: $\{0, 1\}^\kappa \times FS_\kappa \times \{0, 1\}^\kappa \times FS_\kappa \to Z_p$, F: $\{0, 1\}^\kappa \times G \to Z_p^2$ $r_i$=tPRF($\sim r_i$, $\sim r'_i$, $st_i$, $st'_i$), $k_i$=tPRF($\sim k_i$, $\sim k'_i$, $st_i$, $st'_i$) and $s_i$=tPRF($\sim s_i$, $\sim s'_i$, $st_i$, $st'_i$), and $\sim r_i \in_R \{0, 1\}^\kappa$, $\sim r'_i \in_R FS_\kappa$, $\sim k_i \in_R \{0, 1\}^\kappa$, $\sim k'_i \in_R FS_\kappa$, $\sim s_i \in_R \{0, 1\}^\kappa$, and $\sim s'_i \in_R FS_\kappa$, G denotes a multiplication cyclic group of a prime number order p of κ bits and each of g and h denotes a generation source of the group G;
receive (sid, $R_n$, $R_2$) from the key distribution device S, generate $K_1^l$ by using (sid, $R_n^{r1}$) based on a pseudo-random function, compute $T_1$ by an exclusive OR of $K_1^l$ and $k_1\|s_1$, and transmit $T_1$ to the key distribution device S; and
receive k' from the key distribution device S and generate a common key $K_2$, which is used by the communication devices $U_i$ to decrypt information multicast to the communication devices $U_i$, by using sid and an exclusive OR of k' and $k_1$ based on the pseudo-random function.

6. A communication device, in which n denotes an integer which is 2 or larger, j denotes an integer which is from 2 to n inclusive, ‖ denotes a concatenation operator, and a and 3 denote integers defined by the following formulas:

$$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases},$$

the communication device comprising:
circuitry configured to:
store a secret key $sk_j$ and secret strings $st_j$ and $st'_j$ for public key encryption in a storage;
generate $r_j$, $k_j$, and $s_j$ by using the secret strings $st_j$ and $st'_j$ based on a twisted pseudo-random function, compute $R_j=g^{r_j}$ and $c_j=g^{k_j}h^{s_j}$, and transmit $(R_j, c_j)$ to a key distribution device S, wherein the twisted pseudo-random function is tPRF: $\{0, 1\}^\kappa \times FS_\kappa \times \{0, 1\}^\kappa \times FS_\kappa \to Z_p$, F: $\{0, 1\}^\kappa \times G \to Z_p^2$ $r_i=tPRF(\sim r_i, \sim r'_i, st_i, st'_i)$, $k_i=tPRF(\sim k_i, \sim k'_i, st_i, st'_i)$ and $s_i=tPRF(\sim s_i, \sim s'_i, st_i, st'_i)$, and $\sim r_i \in_R \{0, 1\}^\kappa$, $\sim r'_i \in_R FS_\kappa$, $\sim k_i \in_R \{0, 1\}^\kappa$, $\sim k'_i \in_R FS_\kappa$, $\sim s_i \in_R \{0, 1\}^\kappa$, and $\sim s'_i \in_R FS_\kappa$, G denotes a multiplication cyclic group of a prime number order p of κ bits and each of g and h denotes a generation source of the group G;
receive (sid, $R_\alpha$, $R_\beta$) from the key distribution device S, generate $K_j^l$ by using (sid, $R_\alpha^{r_j}$) based on a pseudo-random function, generate $K_j^r$ by using (sid, $R_\beta^{r_j}$) based on the pseudo-random function, compute $T_j$ by an exclusive OR of $K_j^l$ and $K_j^l$, and transmit $(k_j, s_j, T_j)$ to the key distribution device S; and
receive (k', $T_j$, $T_1$) from the key distribution device S, compute $K_j^l$ by an exclusive OR of $T'_j$ and $K_j^r$, compute $k_1\|s_1$ by an exclusive OR of $T_1$ and $K_j^l$, and generate a common key $K_2$, which is used by the communication devices $U_i$ to decrypt information multicast to the communication devices $U_i$, by using sid and an exclusive OR of k' and $k_1$ based on the pseudo-random function.

7. A non-transitory computer readable medium including computer executable instructions that make a communication device, in which n denotes an integer which is 2 or larger and $\|$ denotes a concatenation operator, perform a method comprising:
storing a secret key $sk_1$ and secret strings $st_1$ and $st'_1$ for public key encryption in a storage;
generating $r_1$, $k_1$, and $s_1$ by using the secret strings $st_1$ and $st'_1$ based on a twisted pseudo-random function, computing $R_1=g^{r_1}$ and $c_1=g^{k_1}h^{s_1}$, and transmitting $(R_1, c_1)$ to a key distribution device S, wherein the twisted pseudo-random function is tPRF: $\{0, 1\}^\kappa \times FS_\kappa \times \{0, 1\}^\kappa \times FS_\kappa \to Z_p$, F: $\{0, 1\}^\kappa \times G \to Z_p^2$ $r_i=tPRF(\sim r_i, \sim r'_i, st_i, st'_i)$, $k_i=tPRF(\sim k_i, \sim k'_i, st_i, st'_i)$ and $s_i=tPRF(\sim s_i, \sim s'_i, st_i, st'_i)$, and $\sim r_i \in_R \{0, 1\}^\kappa$, $\sim r'_i \in_R FS_\kappa$, $\sim k_i \in_R \{0, 1\}^\kappa$, $\sim k'_i \in_R FS_\kappa$, $\sim s_i \in_R \{0, 1\}^\kappa$, and $\sim s'_i \in_R FS_\kappa$, G denotes a multiplication cyclic group of a prime number order p of κ bits and each of g and h denotes a generation source of the group G;
receiving (sid, $R_n$, $R_2$) from the key distribution device S, generating $K_1^l$ by using (sid, $R_n^{r_1}$) based on a pseudo-random function, computing $T_1$ by an exclusive OR of $K_1^l$ and $k_1\|s_1$, and transmitting $T_1$ to the key distribution device S; and
receiving k' from the key distribution device S and generating a common key $K_2$, which is used by the communication devices $U_i$ to decrypt information multicast to the communication devices $U_i$, by using sid and an exclusive OR of k' and $k_1$ based on the pseudo-random function.

8. A non-transitory computer readable medium including computer executable instructions that make a communication device, in which n denotes an integer which is 2 or larger, j denotes an integer which is from 2 to n inclusive, $\|$ denotes a concatenation operator, and α and β denote integers defined by the following formulas:

$$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases},$$

perform a method comprising:
storing a secret key $sk_j$ and secret strings $st_j$ and $st'_j$ for public key encryption in a storage;
generating $r_j$, $k_j$, and $s_j$ by using the secret strings $st_j$ and $st'_j$ based on a twisted pseudo-random function, computing $R_j=g^{r_j}$ and $c=g^{k_j}h^{s_j}$, and transmitting $(R_j, c_j)$ to a key distribution device S, wherein the twisted pseudo-random function is tPRF: $\{0, 1\}^\kappa \times FS_\kappa \times \{0, 1\}^\kappa \times FS_\kappa \to Z_p$, F: $\{0, 1\}^\kappa \times G \to Z_p^2$ $r_i=tPRF(\sim r_i, \sim r'_i, st_i, st'_i)$, $k_i=tPRF(\sim k_i, \sim k'_i, st_i, st'_i)$ and $s_i=tPRF(\sim s_i, \sim s'_i, st_i, st'_i)$, and $\sim r_i \in_R \{0, 1\}^\kappa$, $\sim r'_i \in_R FS_\kappa$, $\sim k_i \in_R \{0, 1\}^\kappa$, $\sim k'_i \in_R FS_\kappa$, $\sim s_i \in_R \{0, 1\}^\kappa$, and $\sim s'_i \in_R FS_\kappa$, G denotes a multiplication cyclic group of a prime number order p of κ bits and each of g and h denotes a generation source of the group G;
receiving (sid, $R_\alpha$, $R_\beta$) from the key distribution device S, generating $K_j^l$ by using (sid, $R_\alpha^{r_j}$) based on a pseudo-random function, generating $K_j^r$ by using (sid, $R_\beta^{r_j}$) based on the pseudo-random function, computing $t_j$ by an exclusive or of $k_j^l$ and $k_j^r$, and transmitting $(k_j, s_j, T_j)$ to the key distribution device S; and
receiving (k', $T'_j$, $T_1$) from the key distribution device S, computing $K_j^l$ by an exclusive OR of $T'_j$ and $K_j^r$, computing $k_1\|s_1$ by an exclusive OR of $T_1$ and $K_j^l$, and generating a common key $K_2$, which is used by the communication devices $U_i$ to decrypt information multicast to the communication devices $U_i$, by using sid and an exclusive OR of k' and $k_1$ based on the pseudo-random function.

* * * * *